May 31, 1949. F. S. STEWART ET AL 2,471,500
COATED METAL STRUCTURE
Filed July 25, 1944

Francis S. Stewart
Vernal R. Hardy
INVENTORS

BY
ATTORNEY

Patented May 31, 1949

2,471,500

UNITED STATES PATENT OFFICE 2,471,500

COATED METAL STRUCTURE

Francis S. Stewart, Los Angeles, Calif., and Vernal R. Hardy, Wilmington, Del., assignors, by direct and mesne assignments, to Douglas Aircraft Company, Inc., Santa Monica, Calif., a corporation of Delaware Application July 25, 1944, Serial No. 546,524

8 Claims. (Cl. 117—75)

This invention relates to the coating of metal surfaces and to new and improved coating compositions having particular utility for the coating of metal surfaces. In view of its exceedingly great utility in lining and sealing metal gasoline containers in airplanes, particularly as a means for converting the spaces within metal airplane wings into gasoline containers, this invention will be described with specific reference to metal airplane wing tanks. It is to be understood, however, that the invention, in its broad aspects, relates in general to the coating of any metal surface.

In the interests of efficient utilization of space, rapid production, and light weight construction, wings of airplanes have been constructed so that fuel and oil may be stored directly therein. The construction of such wings involves the use of riveted, bolted, spot-welded or otherwise similarly bonded joints and seams. Such seams, unless properly sealed, give rise to leakage of fuel or oil and cannot be tolerated. Many attempts have been made to improve and if possible to prevent such leakage by coating, lining, or sealing the interior surfaces and joints of the wing tanks with an adherent continuous film which is insensitive to all fuels and lubricating oils. A very extensive test of available coating compositions failed, however, to efficiently seal such tanks. Prior to this invention, therefore, it was often necessary to remove the plane from service until such leaks could be repaired. In order to effectively and permanently seal a metal airplane wing tank against leakage, a coating is required which:

(1) Is simple and practical to apply,
(2) Is sufficiently solid so as not to exude through the joints, seams and rivet holes,
(3) Is very resistant to aviation fuels, and impermeable to them,
(4) Is resistant to water and moisture,
(5) Is tough and flexible even at very low temperatures,
(6) Is not aged or deleteriously affected by prolonged exposures to desert conditions where temperatures within dry airplane compartments might easily reach 200° F.,
(7) Is adherent to the metal even under the rigors of intense vibration and pressure surges within the tank. For example, the minute vibrations of rivets and movements at seams appeared for a time to make it impossible to develop a coating which would be completely satisfactory.

It is an object of this invention to provide a coating composition, which when applied to metal, will be tough and strong and will have an exceedingly strong adherence thereto.

It is another object of this invention to provide a new and improved method of coating metal.

It is still another object of this invention to provide a metal article containing a strong, tough adherent coating.

It is a further object of this invention to provide a metal airplane wing tank having a lining or coating which is proof against fuel and oil leakage.

Other objects of the invention will appear hereinafter.

The objects of this invention may be accomplished, in general, by applying to a metal surface, and, in the case of riveted or seamed surfaces, over rivets and across seam apertures, a plurality of coats of a coating composition comprising a solution of a synthetic linear polyamide admixed with a dispersion of a rubber-like polymer of the unit

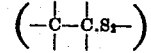

in which the two carbon atoms may be joined to each other or may contain an intervening structure therebetween. Particularly desirable results are obtained when the rubber-like polymer consists of the reaction product of an organic dihalide having —CH₂X terminal groups and a metal polysulfide. (X represents a halide.)

The term "synthetic linear polyamide," as used throughout the specification and claims, is intended to refer specifically to the material described and claimed in U. S. Letters Patents Nos. 2,071,250; 2,071,253; 2,130,948; 2,252,554; 2,252,555 and 2,285,009. The polyamides therein described are high molecular weight products comprising the reaction product of a polyamide-forming composition in which the molecules are bifunctional and contain two amide-forming groups, each of which is complementary to another amide-forming group in said composition. These polyamides can be obtained by self-polymerization of monoaminomonocarboxylic acids or by reacting a diamine with a dicarboxylic acid in substantially equimolecular amounts, it being understood that reference herein to the amino acids and dicarboxylic acids is intended to include the equivalent amide-forming derivatives of the amino acids and of the dicarboxylic acids. These linear polyamides include also polymers obtained by admixture of other linear polymer-forming reactants. In either instance the amide group is an integral part of the main chain of atoms in which, in the case of the preferred fiber-forming polyamides, the average number of atoms separating the amide groups is at least two. The synthetic linear interpolyamides disclosed in U. S. Patents Nos. 2,252,554; 2,252,555 and particularly in Patent No. 2,285,009 are preferred synthetic linear polyamides for use in accordance with the present invention.

Polymers of the unit

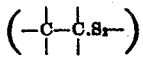

in which the two carbon atoms may be joined to each other or may contain an intervening structure therebetween are disclosed in the U. S. Patents Nos. 1,890,191 and 2,216,044. The rubber-like polymeric reaction product of an organic dihalide and a metal polysulfide is sold commercially. Such rubber-like products may be produced by reacting an organic dihalide having —$CH_2X$ terminal groups, for example, ethylene dichloride, or dichloroethyl ether with a metal polysulfide, for example, sodium tetrasulfide.

The details of the invention will be more clearly apparent by reference to the following detailed description when taken in connection with the accompanying drawings, in which.

Figure 1:
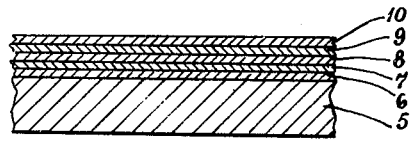
Fig. 1 is a cross-sectional view of a metal structure containing a plurality of coatings.

Referring to Fig 1, reference numeral 5 designates a metal plate containing a plurality of coats, 6, 7, 8, 9, and 10 of a composition comprising a mixture of a synthetic linear polyamide and a polymeric reaction product of an organic dihalide and a metal polysulfide.

Figure 2:
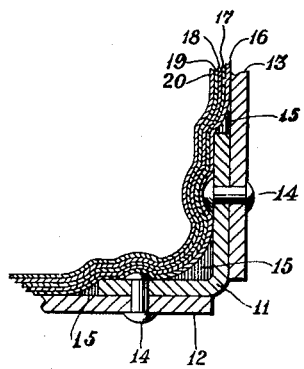
Fig. 2 is a cross-sectional view of a fragment of a riveted metal structure containing a plurality of coatings for sealing the metal structure.

Fig. 2 discloses a metal structure comprising plates 13 and 12 connected by means of rivets 14 to an angle plate 11. Fillets 15 are preferably placed in the corners of the structure, as shown. The fillets 15 are composed of a polymeric reaction product of suitable properties such as, for example, a polymeric reaction product of an organic dihalide and a metal polysulfide or a nylon derivative prepared by treatment of a nylon (synthetic linear polyamide) with formaldehyde and methanol (as described in the copending patent application of T. L. Cairns Serial No. 445,635 and now abandoned). A plurality of coatings 16, 17, 18, 19 and 20 are applied to cover the metal members 13 and 12 as well as the fillets 15. The coatings are composed of a composition comprising a mixture of a synthetic linear polyamide and a polymeric reaction product of an organic dihalide and a metal polysulfide.

The following examples illustrate preferred methods of carrying out the present invention, it being understood that these examples are illustrative and the specific details given therein are not to be taken as limitative of the invention.

Example I

A panel of anodized aluminum was coated successively with the following mixtures of a nylon compound of the synthetic linear interpolyamide of hexamethylene adipamide, hexamethylene sebacamide, and epsilon caprolactam in the proportion of 35.5:26.5:38 having an average molecular weight of 21,000 dissolved in aqueous ethanol solvent, with an alcohol-dispersed latex of a polymeric organic dihalide-metal polysulfide reaction product obtainable commercially as a 55% to 60% by weight dispersion in ethanol-water mixtures.

| Coat No. | Solids Ratio | | Solids Content of Composition, Per Cent | Ethanol in the Aqueous Ethanol Solvent, Per Cent |
|---|---|---|---|---|
| | Nylon, Per Cent | Polymeric Polysulfide, Per Cent | | |
| 1 | 12.8 | 87.2 | 43 | 77 |
| 2 | 12.8 | 87.2 | 43 | 77 |
| 3 | 42.8 | 57.2 | 26 | 83 |
| 4 | 42.8 | 57.2 | 26 | 83 |
| 5 | 60.7 | 39.3 | 21 | 84 |
| 6 | 60.7 | 39.3 | 21 | 84 |
| 7 | 79.5 | 20.5 | 18 | 85 |

Each coating was air dried one hour (but its drying could be accelerated by contacting the same with hot air at 80° C. for twenty minutes) before applying the next coating. The total coating thickness was 0.008 inch. After a 16 hour exposure to a gasoline-water mixture, it was found that the coating was still strongly adherent to the metal, and had not been significantly affected by the gasoline or water. The coating had good flexibility and high resistance to cracking when exposed to temperatures as low as —30° F.

Example II

An anodized aluminum tank having joints, seams, and riveted parts representative of airplane wing construction was first treated by filleting the joints, seams, corners, etc., with a putty composed of asbestos fibers mixed with a polymeric organic dihalide-metal polysulfide reaction product, obtainable commercially as a putty having a high polymeric organic polysulfide latex content reinforced with asbestos fibers. The tank was then internally coated with exactly the same system of compositions as that used in Example I. Each coating was dried in hot air for 20 minutes at 80° C. before the application of the next coat. It was found that when the tank was partly filled with aromatic aviation gasoline composed of 100-octane gasoline high in isopropyl ether to which methyl ethyl ketone, benzene, toluene, and xylene had been added to increase its aromatic character, and vigorously vibrated and subjected to pressure surges, there was no perceptible leak during the period of the test, which ran for 500 hours. In a similar test with currently used coating and sealing materials leakage was observed after 30–50 hours.

Example III

The angles and cracks of an aluminum tank similar to the one used in Example II were carefully filleted with the same putty, and then coated successively with the following compositions, which are of the same character as those described in Example I.

| Coat No. | Solids | | Solids Content of Composition, Per Cent | Ethanol in the Ethanol-Water Solvent, Per Cent |
|---|---|---|---|---|
| | Nylon, Per Cent | Polymeric Polysulfide of Example I, Per Cent | | |
| 1 | 12.8 | 87.2 | 43 | 77 |
| 2 | 12.8 | 87.2 | 43 | 77 |
| 3 | 12.8 | 87.2 | 43 | 77 |
| 4 | 24.0 | 76.0 | 35 | 80 |
| 5 | 24.0 | 76.0 | 35 | 80 |
| 6 | 24.0 | 76.0 | 35 | 80 |
| 7 | 42.8 | 57.2 | 26 | 83 |
| 8 | 42.8 | 57.2 | 26 | 83 |
| 9 | 42.8 | 57.2 | 26 | 83 |
| 10 | 60.7 | 39.3 | 21 | 84 |
| 11 | 60.7 | 39.3 | 21 | 84 |
| 12 | 60.7 | 39.3 | 21 | 84 |

Each coating was dried in air for one hour, but could have been force dried at 150° F. for fifteen minutes before application of the next coating. Subjection of the tank, half-filled with aromatic aviation gasoline, to pressure surges and vibration for a period of 500 hours did not result in the development of any perceptible leaks.

Example IV

An aluminum tank similar to that described in Example II was internally coated with the graded series of nylon-polymeric polysulfide compositions exactly as described in Example III, with two exceptions. First instead of using a nylon composed of an interpolyamide of hexamethylene adipamide, hexamethylene sebacamide, and caprolactam, there was used a nylon consisting of the derivative of polyhexamethylene adipamide prepared by treatment with formaldehyde and methanol (as described in U. S. patent application Serial No. 445,635) in such a way that about 36% of the amide nitrogens carried hydroxymethyl or methoxy-methyl groups as side chains. Second, the polymeric polysulfide putty described in Example II used for filleting the sharp angles was modified by the addition of approximately 10% of its weight of the same nylon, i. e., N-methoxy-methyl derivative of polyhexamethylene adipamide. This tank was filled with aromatic hydrocarbon aviation gasoline and subjected to vibration and pressure surges for a period of 770 hours, at which time no leaks had developed and the tank lining appeared to be in perfect condition.

Example V

The angles and cracks of an aluminum tank similar to the one used in Example II were carefully filleted with a putty of the type described in that example. The filleted structure was then coated successively with the following compositions which are of the same character as given in Example I.

| Coat No. | Solids | | Solids Content of Composition, Per Cent | Ethanol in the Ethanol-Water Solvent, Per Cent |
|---|---|---|---|---|
| | Nylon, Per Cent | Polymeric Polysulfide of Example I, Per Cent | | |
| 1 | | 100 | 60 | 40 |
| 2 | 12.5 | 87.5 | 43 | 77 |
| 3 | 12.5 | 87.5 | 43 | 77 |
| 4 | 12.5 | 87.5 | 43 | 77 |
| 5 | 25 | 75 | 35 | 80 |
| 6 | 25 | 75 | 35 | 80 |
| 7 | 25 | 75 | 35 | 80 |
| 8 | 37.5 | 62.5 | 26 | 83 |
| 9 | 37.5 | 62.5 | 26 | 83 |
| 10 | 37.5 | 62.5 | 26 | 83 |
| 11 | 62.5 | 37.5 | 21 | 84 |
| 12 | 62.5 | 37.5 | 21 | 84 |
| 13 | 62.5 | 37.5 | 21 | 84 |

The above coatings were applied by brush, and each coating dried for 15-30 min. at a temperature of 80° C., before application of the succeeding coating. The bond strength of the final product to the aluminum structure was 9.9 lbs. per inch.

A similar series of coatings was applied to an aluminum structure with the omission of the first coat consisting of polymeric polysulfide. The bond strength of this structure to the aluminum structure was 12.1 lbs. per inch.

For comparison as to bond strength, 6 coats of a 15% solution of the same nylon used in Example I (without the polymeric polysulfide) in a solvent comprising 86% ethyl alcohol and 14% water were applied to a similar aluminum structure. The total coating thickness was about 0.0033 inch. The bond strength of this product to the aluminum structure was 1.8 lbs. per inch.

The bond strength tests were made with a Scott testing apparatus at 25° C. and 72% relative humidity on 1″ x 5″ sections, stripping the coated material back through an angle of 180°, at a rate of 12 inches per minute.

Example VI

An aluminum structure was coated successively with the following mixtures of nylon of the same composition as given in Example I and the polymeric polysulfide of Example I. No filleting material was used at all.

| Coat No. | Solids | | Solids Content of Composition, Per Cent | Ethanol in the Ethanol-Water Solvent, Per Cent |
|---|---|---|---|---|
| | Nylon, Per Cent | Polymeric Polysulfide of Example I, Per Cent | | |
| 1 | 37.5 | 62.5 | 26 | 83 |
| 2 | 37.5 | 62.5 | 26 | 83 |
| 3 | 37.5 | 62.5 | 26 | 83 |
| 4 | 37.5 | 62.5 | 26 | 83 |
| 5 | 37.5 | 62.5 | 26 | 83 |
| 6 | 37.5 | 62.5 | 26 | 83 |
| 7 | 62.5 | 37.5 | 21 | 84 |
| 8 | 62.5 | 37.5 | 21 | 84 |
| 9 | 62.5 | 37.5 | 21 | 84 |
| 10 | 62.5 | 37.5 | 21 | 84 |
| 11 | 62.5 | 37.5 | 21 | 84 |
| 12 | 62.5 | 37.5 | 21 | 84 |

While the adhesion of this system was not equal to that of the other examples where the first coats were 12.5% nylon blends, there was considerable adhesion and the system possessed greater toughness and hardness than systems with lower nylon content base coats. Each layer of these coatings was allowed to air dry about an hour although ½ hour is adequate on warm days (70–90° F.).

Example VII

The coatings of Example VI were applied over angles, ends of rivets, and ends of bolts as well as bolt heads, but to obtain greater adhesion, an aromatic fuel resistant primer coat (composition I) was applied in one test and in another test a different commercially available aromatic fuel resistant formulation (composition II) was applied. These compositions were applied to the metal surface as the first coating.

Composition I is a 15% solution in methyl ethyl ketone of a 45/45/10 mixture of a 60/40 butadiene/acrylonitrile copolymer, a phenol-formaldehyde resin and a phenol (such as m-cresol) containing a small amount of litharge.

Composition II is a chlorinated hydrocarbon solution of a tacky polymeric organic polysulfide base material having good resistance to hydrocarbons. The series of coatings were as follows:

| Coat No. | Solids Nylon, percent | Solids Composition I or Composition II | Solids Content of Composition, percent | Solvent of Composition I and Composition II |
|---|---|---|---|---|
| 1 | | 100 Polymeric polysulfide of Example 1, percent | 50 | 50 Ethanol in the Ethanol-Water Solvent |
| 2 | 37.5 | 62.5 | 26 | 83 |
| 3 | 37.5 | 62.5 | 26 | 83 |
| 4 | 37.5 | 62.5 | 26 | 83 |
| 5 | 37.5 | 62.5 | 26 | 83 |
| 6 | 37.5 | 62.5 | 26 | 83 |
| 7 | 37.5 | 62.5 | 26 | 83 |
| 8 | 62.5 | 37.5 | 21 | 84 |
| 9 | 62.5 | 37.5 | 21 | 84 |
| 10 | 62.5 | 37.5 | 21 | 84 |
| 11 | 62.5 | 37.5 | 21 | 84 |
| 12 | 62.5 | 37.5 | 21 | 84 |
| 13 | 62.5 | 37.5 | 21 | 84 |

This type of seal possessed greater toughness and adhesion than the lower nylon content blends and is valuable where projections mar a smooth surface. They may also be used without a fillet. Where there is particularly severe twisting and vibration of the metal surfaces, and great toughness is required, this system possessed the greater adhesion needed under those circumstances. Such an adhesion requirement is not present on flat surfaces such as between faying surfaces of wing stiffeners and skin.

The alkoxy-methyl polyamide filleting material was applied by warming and pressing into the desired location. The layers of nylon-polymeric polysulfide blends were brushed over the fillet and test box walls, each coat being allowed to air dry for ½ to 1 hour, with the higher nylon blends requiring less time than the lower nylon blends. When this test tank was vibrated at about 3000 cycles per minute with $\frac{1}{32}''$ amplitude and with 1 to 3 lbs. pulsating pressure at five cycles per minute for 101 hours there was no failure. The same tank was subsequently wracked (twisted in such a way as to simulate the twisting of an airplane wing tank of a plane in flight) for another 101 hours. There was still no failure. Thereafter the same tank was subjected to a pulsating pressure of 1 to 3 lbs./sq. in. at —70° F. for an additional 100 hours with still no failure. After this test the same test was again installed on the vibrator and subjected to the same conditions as during the first 101 hours for an additional 178 hours. There was still no failure and the test was stopped. During the entire test period the tank was at least half full of aromatic gasoline and while at outside weather temperatures also contained a pint of water which settled adjacent the bottom of the tank.

In the above examples, specific reference was made to the coating of anodized aluminum airplane wing tanks. Anodized aluminum is, of course, well known in the art as aluminum which has been subjected to acid during the imposition of an electric current in which the aluminum is made the anode of the electric circuit. The invention is not, of course, limited to anodized aluminum metal surfaces. The coatings of the present invention will adhere about as well to structures composed of other metals, for example, steel, magnesium-aluminum alloys, copper, brass, other ferrous and non-ferrous alloys and the like. Furthermore, the coating of the present invention will have utility when applied to other structures than wing tanks, for example, metal wires, metal plates, and metal objects of any desired configuration.

In preparing the coating composition of the present invention, it is preferred that the rubber-like polymeric reaction product of an organic dihalide and a metal polysulfide be in the form of a latex, i. e., a dispersion, emulsion, or solution of the polymeric reaction product in a medium such as water or alcohol. Since, however, the reaction product is to be dispersed or dissolved in an aqueous alcohol medium, or other solvent which will disperse or dissolve both the synthetic linear polyamide and the polysulfide reaction product, it is not essential that the composition be made up from a latex of the polysulfide reaction product.

As above indicated, the polymeric polysulfide reaction product is usually made by reacting ethylene dichloride, propylene dichloride or dichlorodiethylether with sodium tetrasulfide. Numerous other organic dihalide-metal polysulfide reaction products have been made and used and these compounds all have a certain similarity. For example, a similar product has been produced by the reaction of di (chloroethyl) formaldehyde acetal with sodium tetrasulfide. Similarly, another product of this type has been made by the reaction of glycerol dichlorohydrin with sodium tetrasulfide. (See the article of Lawrence A. Wood published by the India Rubber World, Volume 102, Number 4, 1940 and U. S. Patents Nos. 1,890,191 and 2,216,044.)

Any synthetic linear polyamide which may be dissolved or dispersed in a common solvent with the polymeric reaction product of an organic dihalide and a metal polysulfide may be used in accordance with the present invention. The interpolyamides disclosed in U. S. Patent No. 2,285,009 have given particularly good results. The interpolyamides disclosed in the above-mentioned patent are prepared by interpolymerizing at least three polyamide-forming compositions, i. e., compositions which are capable of forming a linear polyamide, the said compositions being selected from the group consisting of 6-aminocaproic acid, hexamethylenediamineadipic acid salt, hexamethylenediamine-sebacic acid salt, and the mixed salt of hexamethylenediamine with suberic and azelaic acids. The N-alkoxymethyl derivatives of simple synthetic linear polyamides or synthetic linear interpolyamides have also given outstanding results. These N-alkoxymethyl polyamides may be prepared by reacting a synthetic linear polyamide (either the simple polyamide or the interpolyamide) of the type described in Carothers U. S. Patents Nos. 2,071,250; 2,130,948; 2,252,554 and 2,252,555, in the presence of an oxygen-containing acid catalyst with formaldehyde and an alcohol, as described in U. S. patent application Serial No. 445,635.

As above indicated, a plurality of coatings of the above-mentioned coating compositions should be applied to the metal surface. It is greatly to be preferred that the several coatings be graded to contain varying proportions of the rubber-like reaction product and synthetic linear polyamide. For example, in coating airplane integral wing tanks, it is preferred that the first coat applied to the metal surface should be rich in polymeric polysulfide and low in polyamide content since the polymeric polysulfide gives very good adhesion to the anodized aluminum while the adhesion of the nylon is inferior. However, the polymeric polysulfide is inferior in strength, toughness, and resistance to cracking and it is, therefore, desirable that the final coat applied should be rich in nylon, which is excellent in these properties, and low in polymeric polysulfide. This ability to get all of the good properties of both members of the composition in the total coating is the essence of the graded series of coatings described in the examples above. For the airplane integral wing tanks, neither one of the ingredients by itself would be satisfactory nor would a coating made up of a single mixture of the two ingredients. However, for other uses, a single mixture of the ingredients might be satisfactory or a different graded series might be desired. Under some circumstances, it may be preferred to have none of the polyamide in one or more of the plurality of coats and none of the rubber-like polymeric reaction product in one or more of the other coats. Preferably, for the sealing of wing tanks, the thickness of the coatings should all be about the same, and the complete series of coatings, which are preferably at least four in number, should not have a total thickness of less than ½ mil.

Obviously, the coating composition may be applied either on the inside or the outside of the tank, or both. In the case of wing tanks which have developed leaks, these may be repaired by application of the series of coats of the nature described on the exterior of the tanks.

The mechanical strength of the nylon films built up into a graduated series as described in the examples is so great that they may be applied externally to the dry side of the tank area to prevent fuel or oil from leaking. In such applications the base coat with the greatest adhesion is preferred so that fuel or oil pressing from the interior will not push the film off. Such a method of fuel tank leak repair has been carried out on airplanes in service and several such patches have stood several hundred hours of flight or until time was available for interior repair. The tensile strength of a 62.5:37.5 nylon-polymeric polysulfide blend (the nylon and polymeric polysulfide having the same composition as in Example I), below its yield point, is several hundred lbs. per sq. inch.

The solvent to be employed, and the manner of drying each coat, are also variable over a wide range. The solvent should be one which is capable of retaining the nylon in solution and the polysulfide reaction product in dispersion for a reasonable period of time. Solvents which have been found to be particularly desirable for the preparation of the coating compositions of this invention are those alcohols which contain less than four carbon atoms, for example, methyl alcohol, ethyl alcohol, normal propyl alcohol and isopropyl alcohol. Preferably, these solvents contain between 5% and 25% water.

The individual coatings are preferably dried before application of the next succeeding coatings. The time necessary for drying will, of course, depend upon the temperature at which the drying takes place. In applying the coatings to structural aluminum airplane surfaces (i. e., those surfaces stressed in flight) the drying should not be carried out at a temperature exceeding 90° C.

In accordance with the present invention, it is found that the composition of the present invention comprising a mixture of a synthetic linear polyamide (nylon) and a polymeric reaction product of an organic dihalide and a metal polysulfide (polymeric polysulfide) will have a sufficient adherence to the metal, and sufficient toughness, flexibility and elasticity to prevent leakage of hydrocarbon fluid, such as aviation gasoline, even when a container which is coated with the above mentioned composition is vibrated vigorously over extended periods of time. The combination of the two above mentioned materials produces a result greatly superior to that obtained when either of the materials is used separately.

Since it is obvious that many changes and modifications can be made in the above-described details without departing from the nature and spirit of the invention, it is to be understood that the invention is not to be limited to the details described herein except as set forth in the appended claims.

We claim:

1. As a new article of manufacture, a metal structure coated with a plurality of coats of a mixture of a synthetic linear polyamide comprising the reaction product of a polyamide-forming composition in which the molecules are bifunctional and contain two amide-forming groups each of which is complementary to another amide-forming group in said composition, and a rubber-like composition taken from the class consisting of polymers of the unit

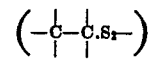

in which the two carbon atoms are joined to each other and polymers of the same unit in which an intervening structure is contained between said carbon atoms, said coats graded to contain a greater proportion of said polyamide in a subsequently applied coat.

2. As a new article of manufacture, a metal structure coated with a plurality of coats of a mixture of a synthetic linear polyamide comprising the reaction product of a polyamide-forming composition in which the molecules are bifunctional and contain two amide-forming groups each of which is complementary to another amide-forming group in said composition, and the rubber-like polymeric reaction product of an organic dihalide having —CH$_2$X terminal groups (X=halide) and a metal polysulfide, said coats graded to contain a greater proportion of said polyamide in a subsequently applied coat.

3. As a new article of manufacture, a jointed metal container internally lined with a plurality of coats of a mixture of a synthetic linear polyamide comprising the reaction product of a polyamide-forming composition in which the molecules are bifunctional and contain two amide-forming groups each of which is complementary to another amide-forming group in said composition, and a rubber-like polymeric reaction product of an organic dihalide having —CH$_2$X terminal groups (X=halide) and a metal polysulfide, said coats graded to contain a greater proportion of said polyamide in a subsequently applied coat.

4. A method of coating a metal structure which comprises applying successively to said structure a plurality of said coats of compositions containing a synthetic linear polyamide comprising the reaction product of a polyamide-forming composition in which the molecules are bifunctional and contain two amide-forming groups each of which is complementary to another amide-forming group in said composition, and the rubber-like polymeric reaction product of an organic dihalide having —CH$_2$X terminal groups, (X=halide) and a metal polysulfide, the coats graded to contain a greater proportion of said polyamide in a subsequently applied coating, and drying each of said coats before the application of a succeeding coating.

5. A new article of manufacture in accordance with claim 1 in which the said structure has angles and fissures, the said angles and fissures being filleted with a N-alkoxymethyl derivative of the said synthetic linear polyamide.

6. A new article of manufacture in accordance with claim 2 in which the said structure has angles and fissures, the said angles and fissures being filleted with a N-alkoxymethyl derivative of the said synthetic linear polyamide.

7. A new article of manufacture in accordance with claim 3 in which the said structure has angles and fissures, the said angles and fissures being filleted with a N-aloxymethyl derivative of the said synthetic linear polyamide.

8. A new article of manufacture in accordance with claim 4 in which the said structure has angles and fissures, the said angles and fissures being filleted with a N-alkoxymethyl derivative of the said synthetic linear polyamide.

FRANCIS S. STEWART.
VERNAL R. HARDY.

REFERENCES CITED

The following references are of record in the file of this patent:

UNITED STATES PATENTS

| Number | Name | Date |
| --- | --- | --- |
| 2,140,672 | Gray et al. | Dec. 20, 1938 |
| 2,162,764 | Swan, 3rd | June 20, 1939 |
| 2,206,642 | Patrick | July 2, 1940 |
| 2,249,686 | Dykstra | July 15, 1941 |
| 2,320,088 | Leekley | May 25, 1943 |